(12) United States Patent
Comstock (10) Patent No.: US 10,531,378 B2
(45) Date of Patent: Jan. 7, 2020

(54) USER EQUIPMENT DETECTION FOR ENERGY SAVING CELL ACTIVATION

(71) Applicants: David Comstock, San Diego, CA (US); Kyocera Corporation, Kyoto (JP)

(72) Inventor: David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 293 days.

(21) Appl. No.: 15/022,861

(22) PCT Filed: Sep. 29, 2014

(86) PCT No.: PCT/US2014/058119
§ 371 (c)(1),
(2) Date: Mar. 17, 2016

(87) PCT Pub. No.: WO2015/048680
PCT Pub. Date: Apr. 2, 2015

(65) Prior Publication Data
US 2016/0234772 A1   Aug. 11, 2016

Related U.S. Application Data

(60) Provisional application No. 61/883,946, filed on Sep. 27, 2013.

(51) Int. Cl.
*H04W 52/02* (2009.01)
*H04L 5/00* (2006.01)
*H04W 74/08* (2009.01)

(52) U.S. Cl.
CPC ....... *H04W 52/0203* (2013.01); *H04L 5/0048* (2013.01); *H04W 74/0866* (2013.01)

(58) Field of Classification Search
CPC ... H04L 5/0048; H04L 5/0051; H04L 5/0053; H04W 52/0203; H04W 52/0206;
(Continued)

(56) References Cited

U.S. PATENT DOCUMENTS

2011/0070881 A1   3/2011   Hwang et al.
2011/0194493 A1*  8/2011   Centonza .......... H04W 52/0235
                                                        370/328
(Continued)

FOREIGN PATENT DOCUMENTS

KR   10-2010-0099605   9/2010
KR   10-2012-0034159   4/2012
(Continued)

*Primary Examiner* — Khoa Huynh (57) ABSTRACT

In a cellular communication system, a UE device being served by a serving communication station is instructed to transmit an uplink signal in accordance with an uplink signal configuration. The uplink signal configuration information is sent to a non-serving communication station in an inactive state where the non-serving communication station cannot provide wireless service. The uplink signal configuration information allows the non-serving communication station to configure its receiver to receive the uplink signal from the UE. Based, at least in part, on information pertaining to the uplink signal received by the non-serving communication station and then sent to the serving communication station, the serving communication station determines whether the UE device is sufficiently near to the non-serving communication station to receive wireless service from the non-serving communication station, in which case the non-serving communication station is activated.

22 Claims, 3 Drawing Sheets

(58) Field of Classification Search
CPC ......... H04W 52/0209; H04W 52/0235; H04W 74/0866; Y02D 70/00; Y02D 70/1262
See application file for complete search history.

(56) References Cited

U.S. PATENT DOCUMENTS

| | | | |
|---|---|---|---|
| 2011/0299446 A1* | 12/2011 | Chun | H04W 36/04 370/311 |
| 2013/0095836 A1* | 4/2013 | Carmon | H04W 52/0206 455/438 |
| 2016/0192432 A1 | 6/2016 | Maeda et al. | |

FOREIGN PATENT DOCUMENTS

| WO | WO 2007-043812 A1 | 4/2007 |
|---|---|---|
| WO | WO 2010-051209 A1 | 5/2010 |
| WO | WO 2010-104295 A2 | 9/2010 |
| WO | WO 2011-099513 A1 | 8/2011 |
| WO | WO 2012/149968 A1 | 11/2012 |
| WO | WO 2013-044957 A1 | 4/2013 |

* cited by examiner

USER EQUIPMENT DETECTION FOR ENERGY SAVING CELL ACTIVATION

PRIORITY CLAIM

The present application claims priority to Provisional Application No. 61/883,946, entitled "UE Detection for ES Cell Activation", filed Sep. 27, 2013, assigned to the assignee hereof, and hereby expressly incorporated by reference.

FIELD

The invention disclosed herein generally relates to wireless communications and more particularly to apparatuses, systems, and methods for determining whether to activate an inactive communication station based, at least partly on, an uplink signal transmitted by a user equipment device and received by the inactive communication station.

BACKGROUND

Many wireless communication systems employ transceiver stations or radio heads to provide service within geographical service areas, where the boundaries of a service area are determined by the radio coverage of its associated transceiver station. Wireless service is provided to user equipment (UE) devices over radio frequency carriers (carriers) within each service area, where a carrier is the modulated waveform that conveys the physical channels as specified by the associated wireless technology standard. These service areas are sometimes referred to as "cells".

Although the term "cell" sometimes refers to the geographical area where multiple uplink and downlink resources (e.g., pairs of uplink and downlink carriers) are used, increasingly the term "cell" is used to refer to the geographical service area where single uplink resource and a single downlink resource are used to communicate with the UE devices. For example, where Time Division Duplex (TDD) is used, a single frequency may be used for uplink and downlink at different times within the "cell". Where Frequency Division Duplex (FDD) is used, a single uplink/downlink frequency pair (one uplink frequency and one downlink frequency) is used within a "cell".

As discussed herein, one or more resources (carrier pairs) may be used in a service area. As a result, a service area may be a single cell or may contain multiple cells. In one common arrangement, each service area is adjacent to several other service areas to provide ubiquitous coverage over a large geographical area.

In some systems, an inactive communication station that is not capable of providing wireless service may be activated and begin providing wireless service to one or more UE devices that are within a service area of the communication station. As discussed below, techniques are needed to determine whether an inactive communication station should be activated.

SUMMARY

In a cellular communication system, a UE device being served by a serving communication station is instructed to transmit an uplink signal in accordance with an uplink signal configuration. The uplink signal configuration information is sent to a non-serving communication station in an inactive state where the non-serving communication station cannot provide wireless service. The uplink signal configuration information allows the non-serving communication station to configure its receiver to receive the uplink signal from the UE. Based, at least in part, on information pertaining to the uplink signal received by the non-serving communication station and then sent to the serving communication station, the serving communication station determines whether the UE device is sufficiently near to the non-serving communication station to receive wireless service from the non-serving communication station, in which case the non-serving communication station is activated.

DETAILED DESCRIPTION

In a cellular communication system, a common cell configuration includes a communication station with a cell that covers a large area and communication stations with smaller cells with coverage that covers a portion of the larger area. The communication stations providing the smaller cells may be only activated under high load conditions when the additional capacity is needed at the location of a small cell and they may be deactivated in order to save energy when their additional capacity is not needed. When these communication stations are not active, they are not capable of providing wireless service to user equipment devices (UE devices). As used interchangeably herein, these communication stations are referred to as energy saving communication stations, inactive communication stations, deactivated communication stations, and non-serving communication stations.

In operation, when there is high load and additional capacity is needed, one or more UE devices may be near enough to an inactive communication station (e.g., non-serving communication station) such that the inactive communication station could provide wireless service to the one or more UE devices if the inactive communication station were activated. More than one inactive communication station may be considered for activation. Thus, by determining which of the one or more inactive communication stations that could serve the largest number of UE devices, the system can optimally activate the least number of inactive communication stations. By activating the least number of inactive communication stations, the amount of energy utilized by the system is minimized.

Moreover, when an inactive communication station is activated, the one or more UE devices that are within the service area provided by the newly activated communication station are handed over from a previously serving communication station to the newly activated communication station. Handing over UE devices from a previously serving communication station to a newly activated communication station frees up communication resources of the previously serving communication station that were being utilized by the UE devices that were handed over. For example, if the traffic load of a serving communication station were to meet or exceed a threshold level, the techniques described herein could be used to determine whether one or more inactive communication stations should be activated in order to reduce the number of UEs being served by the serving communication station and the total load of the cell to be better servedAs used herein, the term "traffic load" generally refers to an amount of communications resources of a particular cell that are being used by the UE devices that are being served by the cell. Traffic load can be expressed in absolute terms or as a measurement relative to the total resources (e.g., capacity) of the cell or the communication station providing the cell.

Figure 1A:
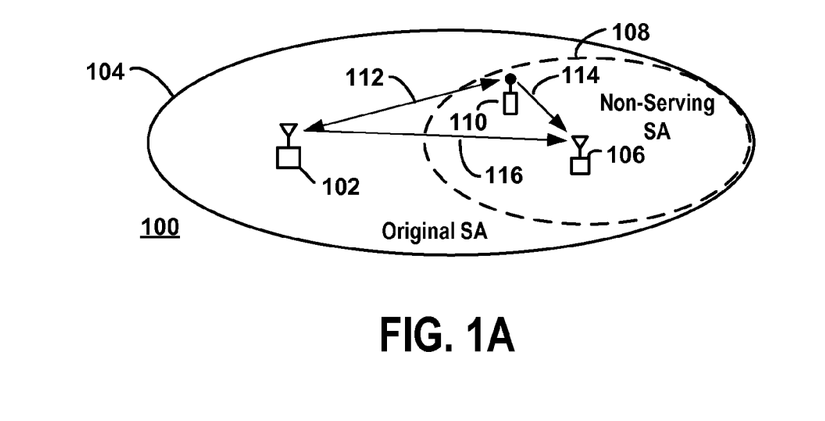
FIG. 1A is an illustration of a system in which the serving communication station determines whether a UE device is sufficiently near to the non-serving communication station to receive wireless service from the non-serving communication station.

FIG. 1A is an illustration of a system in which a serving communication station determines whether a UE device is sufficiently near to the non-serving communication station to receive wireless service from the non-serving communication station. For the example of FIG. 1A, the system 100 includes a serving communication station 102 that provides wireless service within a geographical service area, a portion of which is shown by original service area (e.g., original cell) 104.

The system 100 also includes a non-serving communication station 106 that is inactive and cannot provide wireless service. If the non-serving communication station 106 were to be activated and enabled to provide wireless service, the area in which the non-serving communication station 106 would provide coverage is represented by a non-serving service area (e.g., non-serving cell) 108. The non-serving service area 108 is shown with a dashed line to indicate that the non-serving service area 108 is currently inactive.

Although the communication stations are shown in the figures as only providing one cell, it should be understood that, in other instances, the communication stations discussed herein can provide additional cells besides the cells shown in the figures. Moreover, the shapes representing the service areas of the cells generally illustrate the relationships between the cells and do not necessarily depict the actual shapes of the service areas. Thus, the cells may have any of several shapes and sizes.

Furthermore, the UE device detection techniques discussed with reference to the various figures may be applied to other scenarios. For example, several inactive communication stations may be activated to receive UE devices from a single serving communication station and/or a single inactive communication may be activated to receive UE devices from multiple serving communication stations in accordance with the techniques discussed herein.

Figure 1B:
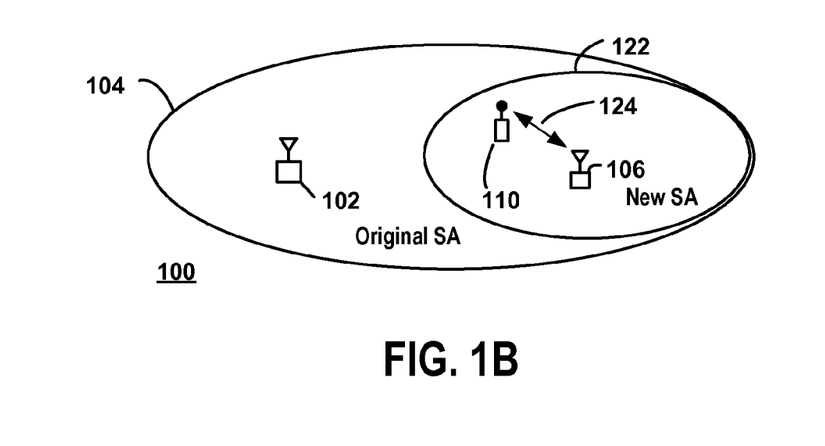
FIG. 1B is an illustration of the system of FIG. 1A where the non-serving communication station has been activated to provide wireless service to the UE device.

In the example of FIG. 1A, serving communication station 102 transmits and receives wireless signals to provide the original cell 104. Upon activation, non-serving communication station 106 also transmits and receives wireless signals to provide the new cell (e.g., service area) 122, as shown in FIG. 1B. Each communication station 102, 106, which also may be referred to as an access node, access point, eNodeB, eNB, base station, and other terms, includes a transceiver and station controller. The controller in each communication station is configured to perform the various methods and operations described herein. The transceiver, or radio head, is typically collocated with the station controller although, in some situations, the station controller may be physically separated from the radio head.

The radio head at least includes radio frequency (RF) transceiver equipment such as antennas, transmitters, and receivers, for transmitting and receiving wireless signals. Typically, radio heads do not include higher level processing and control functions which are performed by the associated station controller. For the illustration of FIGS. 1A and 1B, the radio heads are near a station controller where both the radio head and the controller may be implemented within a single apparatus. Since the location, shape, and size of the cell is determined at least in part by wireless transmission and reception with the communication station, the cell's location and coverage area is determined by the location and operation of the radio head.

As shown in FIG. 1A, the serving communication station 102 provides wireless communication services to wireless communication user equipment device (UE device) 110 within the original service area 104, which covers a geographical service area (e.g., original service area). Although not shown in FIG. 1A, the serving communication station 102 may also provide wireless communication services to additional UE devices.

Communication stations typically provide several cells, but in the interest of brevity and clarity, communication stations 102 and 106 each provide one cell and the full radio and data processing capacity of communication stations 102 and 106 are applied to the service of the cell they provide. Accordingly, for the example shown in FIGS. 1A and 1B, the available capacity of a cell is equivalent to the available capacity of the communication station that provides the cell. As discussed herein, a communication station includes the equipment such as a station controller and radio head that provides a single cell. Accordingly, a communication station can be configured or adjusted to establish the size and shape of the service area of the cell. Several communication stations are typically interconnected through a backhaul (not shown) and to a network (not shown) to provide several service areas to cover large areas. The backhaul may include any combination of wired, optical, and/or wireless communication channels. For the examples herein, the network includes the functionality of the Mobility Management Entity (MME) and the Packet Gateway (P-GW).

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification.

Therefore, for the examples herein, the serving communication station 102 includes a wireless transceiver that transmits downlink signals to the UE device 110 within the original cell 104 in accordance with 3GPP LTE and receives uplink signals from the UE device 110 in accordance with 3GPP LTE. The non-serving communication station 106 includes a wireless transceiver that, upon activation in FIG. 1B, transmits downlink signals to the UE device 110 within the new cell 122 in accordance with 3GPP LTE and receives uplink signals from the UE device 110 in accordance with 3GPP LTE.

The User Equipment (UE) device 110 may be referred to as a mobile device, a wireless device, a wireless communication device, a mobile wireless device, and a UE, as well as by other terms. The wireless communication devices include electronics and code for communicating with communication stations (eNBs) and, in some cases, with other devices including other UE devices. The UE device includes devices such as smart phones, cell phones, personal digital assistants (PDAs), wireless modem cards, wireless modems, televisions with wireless communication electronics, and laptop and desktop computers, as well as other devices. The combination of wireless communication electronics with an electronic device, therefore, may form a wireless communication device. For example, a wireless communication device may include a wireless modem connected to an appliance, computer, or television.

In the example shown in FIG. 1A, the serving communication station 102 is providing wireless service to the UE device 110 by exchanging wireless signals with the UE device 110 over communication link 112. When it is determined that an inactive communication station 106 should be considered for activation, an instruction is sent to the UE device 110 being served by the serving communication station 102 to transmit an uplink signal 114 in accordance with an uplink signal configuration. The determination that the inactive communication station 106 should be considered for activation is made by the serving communication station 102 in this example. However, in other instances, other entities within the system 100 or the larger network may make this determination such as a centralized spectrum management server that determines how the radio coverage in the network is configured based on information collected from multiple nodes in the network.

Regardless of which entity makes the determination that the inactive communication station 106 should be considered for activation, various factors may be involved in making the determination. For example, the current and/or expected traffic load of the serving communication station 102 and the Quality of Service (QoS) requirements and/or subscriber types associated with the UEs being served by the serving communication station 102 may be taken into account when determining whether one or more inactive communication stations should be considered for activation. The serving communication station may determine that all of the small cell communication stations within the large serving area should be considered for activation or it may determine that only certain small cell communication stations should be considered for activation based on its knowledge of the general location of the small cells and the UEs, particularly UEs with high resource utilization.

In the example shown in FIG. 1A, the serving communication station 102 sends the instruction to the UE device 110 over communication link 112 to transmit the uplink signal 114 in accordance with an uplink signal configuration. In this example, the uplink signal 114 comprises a code sequence that does not involve higher layer radio protocols such as Layer 3 signaling. For example, in some instances, the uplink signal 114 can be one or more of the following: a random access preamble on a coverage cell Physical Random Access Channel resource, uplink channel sounding (Sounding Reference Signal measurements), and an uplink coverage cell UE Demodulation Reference Signal.

Additionally, the uplink signal configuration information 116 that corresponds to the uplink signal 114 that will be sent by the UE device 110 is sent to the non-serving communication station 106, which is in an inactive state where the non-serving communication station 106 cannot provide wireless service. As shown in FIG. 1A, the serving communication station 102 sends the uplink signal configuration information 116 to the non-serving communication station 106. The non-serving communication station 106 uses the uplink signal configuration information 116 to configure its radio receiver so that it can receive the uplink signal 114 sent by UE device 110 if it is near enough. If the uplink signal 114 is received by the non-serving communication station, the non-serving communication station 106 sends information about the received uplink signal 114 to the serving communication station 102 that allows the serving communication station 102 to identify UE device 110. Once the serving communication station 102 receives uplink signal reports from the small cell communication stations, it determines the optimal communication station or stations that should be activated in order to offload the largest amount of resources while activating the fewest number of communication stations.

In this example, the non-serving communication station 106 determines whether the UE device 110 is sufficiently near to the non-serving communication station 106 to receive wireless service from the non-serving communication station 106. This determination is based, at least in part, on the uplink signal 114 received at the non-serving communication station 106.

In some cases, the determination whether the UE device 110 is sufficiently near to the non-serving communication station 106 to receive wireless service from the non-serving communication station 106 includes receiving an energy level of the uplink signal 114. More particularly, the energy level of the uplink signal 114 is received and measured by the non-serving communication station 106 and sent to the serving communication station. 102 Based, at least in part, on the energy level, the serving communication station 102 determines whether UE device 110 is sufficiently near to the non-serving communication station 106 to receive wireless service from the non-serving communication station 106 and takes this into consideration when determining whether this non-serving communication station should be activate. For the examples herein, the determination whether the UE device 110 is sufficiently near to the non-serving communication station 106 to receive wireless service from the non-serving communication station 106 is also based, at least in part, on information contained in the uplink signal 114 received at the non-serving communication station 106. More specifically, the non-serving communication station 106 receives the uplink signal 114 and determines the information in the uplink signal 114 by decoding the uplink signal 114 and sending this information to serving communication station 102. In some cases, the information in the uplink signal is unique to the UE device 110 and allows the serving communication station 102 to identify the UE device that transmitted the uplink signal that was received by the non-serving communication station. Based, at least in part, on the information, the serving communication station 106 determines whether the UE device 110 is sufficiently near to the non-serving communication station 106 to receive wireless service from the non-serving communication station 106. The serving communication station 102 may, in part, use its knowledge about UE device 110 to determine which communication stations should be activated. For example, serving communication station 102 could determine to activate non-serving communication station 102 if non-serving communication station 102 detects UE device's 110 uplink signal transmission and UE device 110 requires a level of service such that it is allocated many radio resources. In some situations, the determination of whether the UE device 110 is sufficiently near to the non-serving communication station 106 to receive wireless service from the non-serving communication station 106 may be based on the energy level without decoding the information from the signal received from the UE device 110.

Regardless of the technique used to determine that the UE device 110 is sufficiently near to the non-serving communication station 106 to receive wireless service from the non-serving communication station 106, once this determination is made, the non-serving communication station 106 may be activated to provide wireless service. As described above, the determination of which non-serving communication station(s) to activate may be based on a number of factors, including traffic loads of the various communication stations, the proximity of the various UE devices that are being considered for handover to each of the non-serving communication stations, and the QoS requirements and/or subscriber types associated with each of the UE devices being considered for handover.

In the example shown in FIG. 1B, the non-serving communication station 106 has been activated to provide wireless service in the new service area 122, and the UE device 110 has been handed over from the serving communication station 102 to the non-serving communication station 106. Once it has been activated, the non-serving communication 106 may be referred to as the newly activated communication station 106. As also shown in FIG. 1B, the newly activated communication station 106 provides wireless service to the UE device 110 over the communications link 124, and the new service area (e.g., energy saving service area) 122 of the newly activated communication station 106 at least partially overlaps the original coverage service area 104 of the serving communication station 102.

Figure 2A:
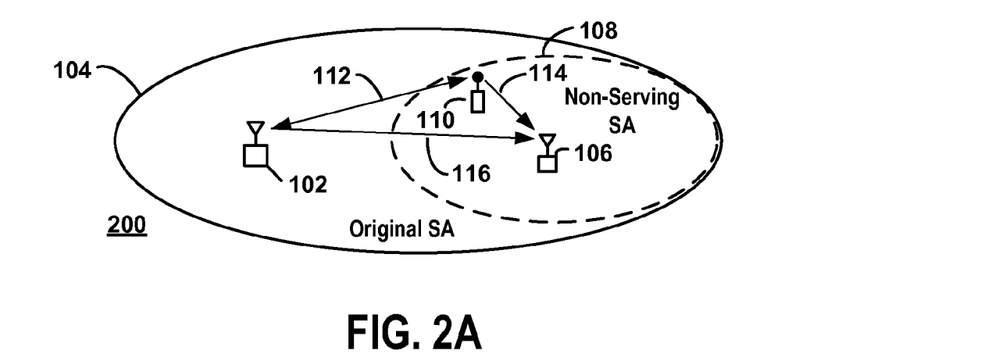
FIG. 2A is an illustration of a system in which the serving communication station determines whether a UE device is sufficiently near to the non-serving communication station to receive wireless service from the non-serving communication station.

FIG. 2A is an illustration of a system in which the serving communication station determines whether a UE device is sufficiently near to the non-serving communication station to receive wireless service from the non-serving communication station. The system 200 includes a serving communication station 102 that provides wireless service within a geographical service area, a portion of which is shown by original service area (e.g., original cell) 104. The system 200 also includes a non-serving communication station 106 that is inactive and cannot provide wireless service. If the non-serving communication station 106 were to be activated and enabled to provide wireless service, the area in which the non-serving communication station 106 would provide coverage is represented by a non-serving service area (e.g., non-serving cell) 108. The non-serving service area 108 is shown with a dashed line to indicate that the non-serving service area 108 is currently inactive.

In the example shown in FIG. 2A, the serving communication station 102 is providing wireless service to the UE device 110 by exchanging wireless signals with the UE device 110 over communication link 112. When it is determined that an inactive communication station 106 should be considered for activation, an instruction is sent to the UE device 110 being served by the serving communication station 102 to transmit an uplink signal 114 in accordance with an uplink signal configuration. The determination that the inactive communication station 106 should be considered for activation is made by the serving communication station 102 in this example. However, in other instances, other entities within the system 100 or the larger wireless network may make this determination such as a centralized spectrum management server that determines how the radio coverage in the network is configured based on information collected from multiple nodes in the network.

Regardless of which entity makes the determination that the inactive communication station 106 should be considered for activation, various factors may be involved in making the determination. For example, the current and/or expected traffic load of the serving communication station 102 and the Quality of Service (QoS) requirements and/or subscriber types associated with the UEs being served by the serving communication station 102 may be taken into account when determining whether one or more inactive communication stations should be considered for activation.

In the example shown in FIG. 2A, the serving communication station 102 sends the instruction to the UE device 110 over communication link 112 to transmit the uplink signal 114 in accordance with an uplink signal configuration. The uplink signal 114 may comprise a code sequence that is unique to the UE and that does not involve higher layer radio protocols such as Layer 3 signaling. For example, in some instances, the uplink signal 114 can be one or more of the following: a random access preamble on a coverage cell Physical Random Access Channel resource, uplink channel sounding (Sounding Reference Signal measurements), and an uplink coverage cell UE Demodulation Reference Signal.

Additionally, the uplink signal configuration information 116 that corresponds to the uplink signal 114 that will be sent by the UE device 110 is sent to the non-serving communication station 106, which is in an inactive state where the non-serving communication station 106 cannot provide wireless service. As shown in FIG. 2A, the serving communication station 102 sends the uplink signal configuration information 116 to the non-serving communication station 106. Although, in other instances, other entities such as centralized spectrum management server may send the uplink signal configuration information 116 to the non-serving communication station 106. The non-serving communication station 106 uses the uplink signal configuration information 116 to configure its radio receiver so that it can receive the uplink signal 114 sent by UE device 110 if it is near enough. If the uplink signal 114 is received by the non-serving communication station, the non-serving communication station 106 sends information about the received uplink signal 114 to the serving communication station 102 that allows the serving communication station 102 to identify UE device 110. Once the serving communication station 102 receives uplink signal reports from the small cell communication stations, it determines the optimal communication station or stations that should be activated in order to offload the largest amount of resources while activating the fewest number of communication stations.

In this example, the serving communication station 102 determines whether the UE device 110 is sufficiently near to the non-serving communication station 106 to receive wireless service from the non-serving communication station 106. This determination is based, at least in part, on information pertaining to the uplink signal 114 received by the non-serving communication station 106. In other cases, the non-serving communication station determines that the UE device 110 is sufficiently near and just sends an indication of this to the serving communication station. This could be a case where it is not important to optimize the activation of non-serving communication stations.

In some cases, the information pertaining to the uplink signal 114 includes an energy level of the uplink signal 114. More particularly, the energy level of the uplink signal 114 is received and measured by the non-serving communication station 106. In other cases, the information pertaining to the uplink signal 114 includes information contained in the uplink signal 114 and determined by the non-serving communication 106 station by decoding the uplink signal 114. The uplink signal may contain a code that identifies the UE device 110 that transmitted the uplink signal. This information may be sent to the serving communication station 102 and the UE device 110's resource requirements can assist the determination of which communication stations to activate. The energy level of the uplink signal received by the non-serving communication station 106 may be sent to the serving communication station 102 and can be used in determining which communication stations should be activated. For example, if more than one non-serving communication station receives a UE device 110 uplink signal, the non-serving communication station that received the signal with the larger energy level may be considered the better candidate for activation.

Figure 2B:
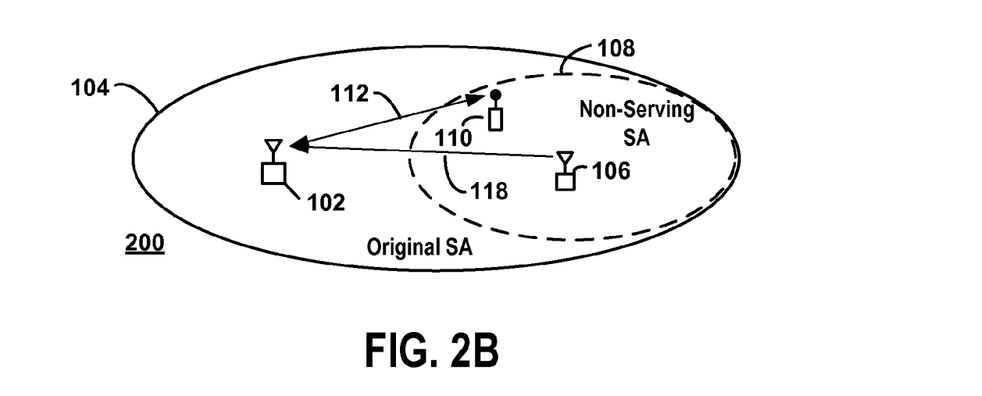
FIG. 2B is an illustration of the system of FIG. 2A where the non-serving communication station is transmitting information pertaining to the received uplink signal to the serving communication station.

Regardless of the technique used to determine the information pertaining to the uplink signal 114, once this information is determined by the non-serving communication station 106, the non-serving communication station 106 transmits the information 118 pertaining to the uplink signal 114 to the serving communication station 102, as shown in FIG. 2B.

Based, at least in part, on the information 118 pertaining to the uplink signal 114, the serving communication station 102 determines whether the UE device 110 is sufficiently near to the non-serving communication station 106 to receive wireless service from the non-serving communication station 106. Once this determination is made, the serving communication station 102 transmits an instruction 120 to activate the non-serving communication station 106. As described above, the determination of which non-serving communication station(s) to activate may be based on a number of factors, including traffic loads of the various communication stations, the proximity of the various UE devices that are being considered for handover to each of the non-serving communication stations, and the QoS requirements and/or subscriber types associated with each of the UE devices being considered for handover.

Figure 2C:
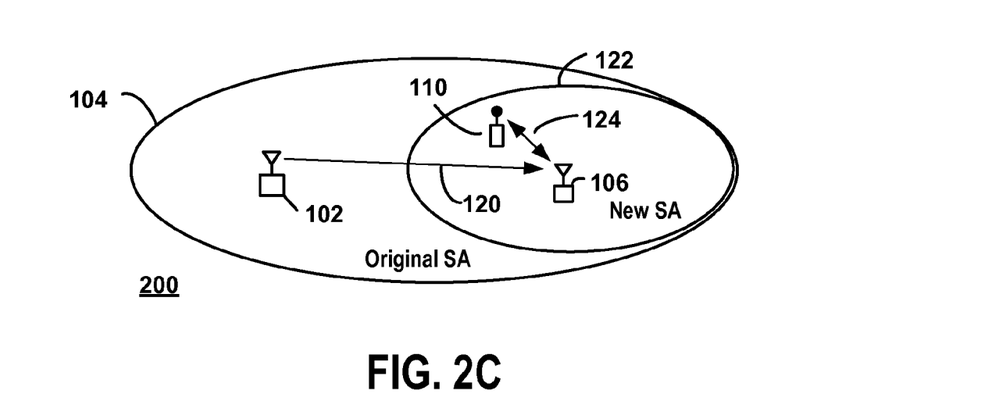
FIG. 2C is an illustration of the system of FIG. 2A where the non-serving communication station has been activated to provide wireless service to the UE device.

In the example shown in FIG. 2C, the non-serving communication station 106 has been activated to provide wireless service in the new service area 122, and the UE device 110 has been handed over from the serving communication station 102 to the non-serving communication station 106. Once it has been activated, the non-serving communication 106 may be referred to as the newly activated communication station 106. As also shown in FIG. 2C, the newly activated communication station 106 provides wireless service to the UE device 110 over the communications link 124, and the new service area (e.g., energy saving service area) 122 of the newly activated communication station 106 at least partially overlaps the original coverage service area 104 of the serving communication station 102.

Figure 3:
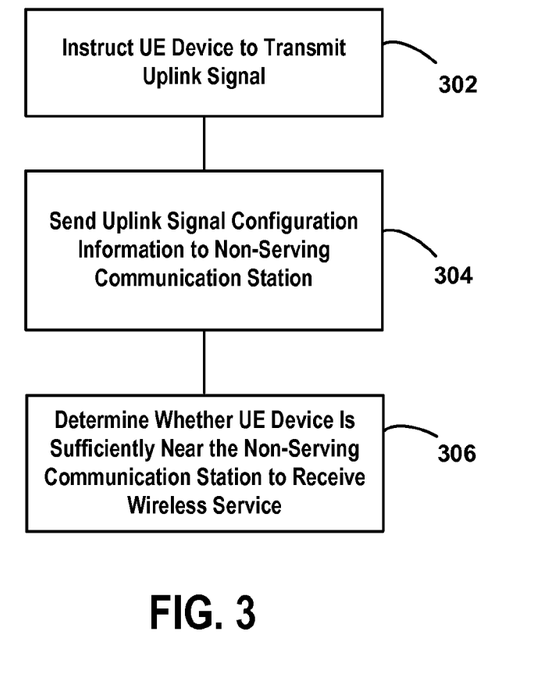
FIG. 3 is a flowchart showing a method of determining whether a UE device is sufficiently near to the non-serving communication station to receive wireless service from the non-serving communication station.

FIG. 3 shows a flowchart of a method of operating the systems shown in FIGS. 1 and 2. The method begins at step 302, in which a UE device being served by a serving communication station is instructed to transmit an uplink signal in accordance with an uplink signal configuration. At step 304, the uplink signal configuration information is sent to a non-serving communication station in an inactive state where the non-serving communication station cannot provide wireless service.

At step 306, it is determined whether the UE device is sufficiently near to the non-serving communication station to receive wireless service from the non-serving communication station. This determination is based, at least in part, on the uplink signal received at the non-serving communication station. In some cases, the determination comprises receiving an energy level of the uplink signal, which is measured by the non-serving communication station, and determining whether the UE device is sufficiently near to the non-serving communication station to receive wireless service from the non-serving communication station based, at least in part, on the energy level. In other cases, the determination comprises receiving information contained in the uplink signal and determined by the non-serving communication station by decoding the uplink signal and determining whether the UE device is sufficiently near to the non-serving communication station to receive wireless service from the non-serving communication station based, at least in part, on the information.

Although not shown in FIG. 3, the method may also include activating the non-serving communication station to provide wireless service in response to a determination that the UE device is sufficiently near to the non-serving communication station to receive wireless service from the non-serving communication station.

Clearly, other modifications and manners of practicing this invention will occur readily to those of ordinary skill in the art in view of these teachings. The above description is illustrative and not restrictive. This invention is to be limited only by the following claims, which include all such modifications and manners of practice when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   transmitting, from a serving communication station to a user equipment device (UE device) being served by the serving communication station, an instruction to transmit an uplink signal in accordance with an uplink signal configuration;
   transmitting, from the serving communication station to a non-serving communication station in an inactive state where the non-serving communication station cannot serve any UE devices and cannot provide wireless service to any UE devices, uplink signal configuration information that corresponds to the uplink signal, the uplink signal configuration information to be used by the non-serving communication station to receive the uplink signal;
   receiving, at the serving communication station from the non-serving communication station, information pertaining to the uplink signal received by the non-serving communication station; and
   transmitting, from the serving communication station to the non-serving communication station, an activation instruction to activate the non-serving communication station from the inactive state to an active state where the non-serving communication station can provide wireless service to at least the UE device.

2. The method of claim 1, further comprising:
 determining, at the serving communication station, whether the UE device is sufficiently near to the non-serving communication station to receive wireless service from the non-serving communication station, the determining based, at least in part, on the information pertaining to the uplink signal received by the non-serving communication station.

3. The method of claim 2, wherein the determining comprises:
 receiving an energy level of the uplink signal, the energy level measured by the non-serving communication station; and
 determining whether the UE device is sufficiently near to the non-serving communication station to receive wireless service from the non-serving communication station based, at least in part, on the energy level.

4. The method of claim 2, wherein the determining comprises:
 receiving information contained in the uplink signal and determined by the non-serving communication station by decoding the uplink signal; and
 determining whether the UE device is sufficiently near to the non-serving communication station to receive wireless service from the non-serving communication station based, at least in part, on the information contained in the uplink signal.

5. The method of claim 2, further comprising:
 in response to a determination that the UE device is sufficiently near to the non-serving communication station to receive wireless service from the non-serving communication station, activating the non-serving communication station to provide wireless service.

6. The method of claim 5, wherein upon activating the non-serving communication station to provide wireless service, the serving communication station has a coverage service area and the non-serving communication station has an energy saving service area that at least partially overlaps the coverage service area.

7. The method of claim 1, further comprising:
 receiving, at the serving communication station from another non-serving communication station, information pertaining to the uplink signal received by the another non-serving communication station; and
 determining, based on the information pertaining to the uplink signal received by the non-serving communication station and the information pertaining to the uplink signal received by the another non-serving communication station, which one or more non-serving communication stations to activate to offload a largest amount of resources while activating a fewest number of non-serving communication stations.

8. A non-serving communication station in an inactive state where the non-serving communication station cannot serve any UE devices and cannot provide wireless service to any UE devices, the non-serving communication station comprising:
 a receiver configured to receive:
  an uplink signal transmitted, in accordance with an uplink signal configuration, from a user equipment device (UE device) being served by a serving communication station, and
  uplink signal configuration information from the serving communication station, the uplink signal configuration information corresponding to the uplink signal, the uplink signal configuration information to be used by the non-serving communication station to receive the uplink signal; and
 a transmitter configured to transmit, to the serving communication station, information pertaining to the uplink signal received by the non-serving communication station,
 the receiver further configured to receive, from the serving communication station, an activation instruction to activate the non-serving communication station from the inactive state to an active state where the non-serving communication station can provide wireless service to at least the UE device.

9. The non-serving communication station of claim 8, further comprising:
 a controller configured to:
  measure an energy level of the received uplink signal; and
  determine whether the UE device is sufficiently near to the non-serving communication station to receive wireless service from the non-serving communication station based, at least in part, on the measured energy level.

10. The non-serving communication station of claim 8, further comprising:
 a controller configured to:
  decode information contained in the received uplink signal; and
  determine whether the UE device is sufficiently near to the non-serving communication station to receive wireless service from the non-serving communication station based, at least in part, on the decoded information.

11. The non-serving communication station of claim 8, further comprising:
 a controller configured to:
  determine, based, at least in part, on the received uplink signal, whether the UE device is sufficiently near to the non-serving communication station to receive wireless service from the non-serving communication station, and
  in response to a determination that the UE device is sufficiently near to the non-serving communication station to receive wireless service from the non-serving communication station, activate the non-serving communication station to provide wireless service.

12. A serving communication station serving a user equipment device (UE device), the serving communication station comprising:
 a transmitter configured to transmit:
  an instruction to the UE device to transmit an uplink signal in accordance with an uplink signal configuration, and
  uplink signal configuration information, which corresponds to the uplink signal, to a non-serving communication station in an inactive state where the non-serving communication station cannot serve any UE devices and cannot provide wireless service to any UE devices, the uplink signal configuration information to be used by the non-serving communication station to receive the uplink signal; and
 a receiver configured to receive, from the non-serving communication station, information pertaining to the uplink signal received by the non-serving communication station,
 the transmitter further configured to transmit, to the non-serving communication station, an activation instruction to activate the non-serving communication station from the inactive state to an active state where the non-serving communication station can provide wireless service to at least the UE device.

13. The serving communication station of claim 12, wherein the information pertaining to the uplink signal comprises an energy level of the uplink signal, the energy level measured by the non-serving communication station.

14. The serving communication station of claim 12, wherein the information pertaining to the uplink signal comprises information contained in the uplink signal and determined by the non-serving communication station by decoding the uplink signal.

15. The serving communication station of claim 12, further comprising:
 a controller configured to:
  determine, based, at least in part, on the information pertaining to the uplink signal, whether the UE device is sufficiently near to the non-serving communication station to receive wireless service from the non-serving communication station, and
  in response to a determination that the UE device is sufficiently near to the non-serving communication station to receive wireless service from the non-serving communication station, transmit the activation instruction to activate the non-serving communication station to provide wireless service.

16. The serving communication station of claim 12, wherein the receiver is further configured to receive, from another non-serving communication station, information pertaining to the uplink signal received by the another non-serving communication station, the serving communication station further comprising a controller configured to determine, based on the information pertaining to the uplink signal received by the non-serving communication station and the information pertaining to the uplink signal received by the another non-serving communication station, which one or more non-serving communication stations to activate to offload a largest amount of resources while activating a fewest number of non-serving communication stations.

17. A system comprising:
 a user equipment device (UE device);
 a serving communication station serving the UE device, the serving communication station comprising a first transmitter configured to transmit an instruction to the UE device to transmit an uplink signal in accordance with an uplink signal configuration; and
 a non-serving communication station in an inactive state where the non-serving communication station cannot serve any UE devices and cannot provide wireless service to any UE device, comprising:
  a receiver configured to receive:
   the uplink signal, and
   uplink signal configuration information corresponding to the uplink signal, the uplink signal configuration information to be used by the non-serving communication station to receive the uplink signal, and
  a second transmitter configured to transmit, to the serving communication station, information pertaining to the uplink signal received by the non-serving communication station, the first transmitter of the serving communication station further configured to transmit, to the non-serving communication station, an activation instruction to activate the non-serving communication station from the inactive state to an active state where the non-serving communication station can provide wireless service to at least the UE device.

18. The system of claim 17, wherein the non-serving communication station further comprises:
 a controller configured to:
  measure an energy level of the received uplink signal; and
  determine whether the UE device is sufficiently near to the non-serving communication station to receive wireless service from the non-serving communication station based, at least in part, on the measured energy level.

19. The system of claim 17, wherein the non-serving communication station further comprises:
 a controller configured to:
  decode information contained in the received uplink signal; and
  determine whether the UE device is sufficiently near to the non-serving communication station to receive wireless service from the non-serving communication station based, at least in part, on the decoded information.

20. The system of claim 17, wherein the non-serving communication station further comprises:
 a controller configured to:
  determine, based, at least in part, on the received uplink signal, whether the UE device is sufficiently near to the non-serving communication station to receive wireless service from the non-serving communication station, and
  in response to a determination that the UE device is sufficiently near to the non-serving communication station to receive wireless service from the non-serving communication station, activate the non-serving communication station to provide wireless service.

21. The system of claim 20, wherein upon activating the non-serving communication station to provide wireless service, the serving communication station has a coverage service area and the non-serving communication station has an energy saving service area that at least partially overlaps the coverage service area.

22. The system of claim 17, wherein the serving communication station further comprises:
 a receiver configured to receive, from another non-serving communication station, information pertaining to the uplink signal received by the another non-serving communication station; and
 a controller configured to determine, based on the information pertaining to the uplink signal received by the non-serving communication station and the information pertaining to the uplink signal received by the another non-serving communication station, which one or more non-serving communication stations to activate to offload a largest amount of resources while activating a fewest number of non-serving communication stations.

* * * * *